United States Patent [19]
Smith

[11] Patent Number: 5,421,013
[45] Date of Patent: May 30, 1995

[54] AGENT-BASED MULTITHREADING APPLICATION PROGRAMMING INTERFACE

[75] Inventor: Curtis A. Smith, West Jordan, Utah

[73] Assignee: Park City Group, Inc., Park City, Utah

[21] Appl. No.: 88,825

[22] Filed: Jul. 8, 1993

[51] Int. Cl.⁶ ............................................. G06F 13/00
[52] U.S. Cl. .............................. 395/650; 364/DIG. 1; 364/284.3; 364/281.3; 364/281.7
[58] Field of Search .................................. 395/700, 650

[56] References Cited

U.S. PATENT DOCUMENTS

| | | | |
|---|---|---|---|
| 5,095,522 | 3/1992 | Fujita et al. | 395/200 |
| 5,265,206 | 11/1993 | Shackelford et al. | 395/155 |
| 5,305,461 | 4/1994 | Feigenbaum et al. | 395/775 |
| 5,327,529 | 7/1994 | Fults et al. | 395/155 |
| 5,347,633 | 9/1994 | Ashfield et al. | 395/200 |

OTHER PUBLICATIONS

Zinc Interface Programmers Guide, Ver. 3.0 Published 1990-92 by Zinc Software Inc., 405 South 100 East 2nd Flr, Pleasant Grove, Utah 84062.

*Primary Examiner*—Kevin A. Kriess
*Assistant Examiner*—St. John Courtenay, III
*Attorney, Agent, or Firm*—Fenwick & West

[57] ABSTRACT

An application programming interface facilitates development of portable, multithreaded application programs. An application is a collection of instances of agent classes. Agent classes are organized in class hierarchies because new subclass agents may be derived from existing base class agents. Each agent class has its own message dispatching function; this allows the application programmer to alter the message passing framework provided by the application programming interface. Each agent instance within the program is independent because it is a sub-process aware only of its own data and context. Multithreading is provided by the application programming interface which contains a master dispatcher process non-preemptively allocating time to individual agents. Therefore, an application's multithreading capability is independent of the platform's operating system. In addition, a thread of execution may be split when the currently activated agent activates the master dispatcher. The application programming interface mediates between the system resources and the application, and maps the user interface of the application to the platform's chosen user interface. Therefore, the application and its user interface are portable.

19 Claims, 10 Drawing Sheets

AGENT-BASED MULTITHREADING APPLICATION PROGRAMMING INTERFACE

BACKGROUND OF THE INVENTION

1. Field of the Invention

This invention relates to the field of application programming interfaces, and, more particularly to a system and method of writing portable multithreaded application programs by creating and combining independent agents.

2. Description of the Related Art

An application programming interface provides a method for programmers to write application programs that run on a particular hardware system. Typically an application programming interface is customized to run on a particular hardware platform. An application programming interface provides system calls to perform certain hardware dependent functions such as getting keyboard input or writing to disk. An application programming interface also provides calls for an application to interface to the platform's user interface, for example, a call to open a window. Therefore, the application programmer can use the calls provided by the application programming interface for performing hardware dependent and user interface functions. This saves the application programmer the time involved in writing hardware dependent and user interface functions; the application programmer need only write the code specific to the application, and may rely on the calls provided by the application programming interface to perform system related functions.

An application program written for a specific application programming interface cannot be ported to another platform with a different application programming interface without replacing all of the system calls for the original application programming interface. It takes a programmer additional time to rewrite these sections of the application program. After the system calls are replaced, the application program is recompiled. It will then run on the platform with the different application programming interface. However, after the changes are made, the application program will then have the user interface look and feel of the programming interface on the new system. The same application program looks different on two different systems because the systems have different user interfaces.

Furthermore, most application programming interfaces do not provide multithreading. Multithreading allows an application program to contain more than one stream of execution; each stream of execution is a thread. Typically, each thread performs a different function within the application program; for example one thread fills a buffer, and another thread reads from the buffer. The application programmer must then rely on the multithreading provided by the operating system on the platform. Some operating systems may not provide any multithreading at all.

In addition, application programming interfaces provide a scheme for sending messages among components of an application program. For example, when a character is entered at the keyboard, a message may be sent to a window telling the window to display the character. Typically an application programmer cannot modify the message passing framework provided by the application programming interface. As a result, the code for message passing must be modified when an application program is ported to a platform with a different application programming interface. It takes the programmer additional time to replace the message passing code.

An application programming interface may or may not be written in an object-oriented language. If the application programming interface is written in an object-oriented language, then the application programmer may define classes and class hierarchies as specified in the object-oriented programming language. Each class may have some functions associated with the data in the class. In a class hierarchy, classes are organized in chains from the general to the more specific. A more specific subclass is derived from a more general base class. For example, if a dialog box were a type of window, then the dialog box subclass would be derived from the more general window base class.

Application programming interfaces written in object-oriented programming languages have the advantage of allowing the more specific class to maintain its own data and context and relying on the base class to maintain the general data and context. Therefore, a programmer can reuse code which saves time and can write a more consistently organized program because there is less duplicate code. Each class is independent of other classes, even a subclass is independent of its base class(es), because the class does not need to know about the other classes' data.

Application programming interfaces that are written in object-oriented languages have the disadvantage of generating larger programs that require more memory to run. In addition, the application programmer must have a compiler for the object-oriented language to compile the application program. Furthermore, the application programmer must know the object-oriented language and be familiar with object-oriented programming.

SUMMARY OF THE INVENTION

In accordance with the present invention, there is provided a system and method of creating application programs using an application programming interface. The application programs are multithreaded, portable to other existing application programming interfaces, and composed of independent agents. Although the application program is not written in an object-oriented programming language, the agents may be organized into class hierarchies, similar to object-oriented class structures.

The present invention includes an application programming interface wherein application programs include a collection of agents. An agent is an instance of a particular agent class. Agent classes are defined by the application programmer. Because new subclass agents may be derived from existing base class agents, the agency application programming interface provides class hierarchies.

Each agent has three distinct components: a message queue, message dispatcher, and message processor. An instance of an agent subclass can have a different message dispatcher and message processor than an instance of its base class. Because each agent instance has its own message dispatcher and message processor, each agent is aware of its own data and context. The application programming interface is an "agency" which mediates between the collection of agents that form the application and the platform's shared system resources. The agency communicates with an individual agent through its message queue. The agent processes the messages on its queue using its message dispatcher and its message processor.

In addition, each agent is a separate sub-process within an application program created by using the agency application programming interface. The agency application programming interface contains a master dispatcher which maintains a list of agents. The master dispatcher selects an agent to activate and activates the selected agent by calling its message dispatcher. When the selected agent is through performing its agency application function it designates itself as inactive. After the agent has designated itself inactive, the master dispatcher resumes running and then selects the next agent to activate.

The current thread of execution may be split when the currently active agent activates the master dispatcher by calling the master dispatcher. The current thread is then suspended until it is reactivated by the master dispatcher. The master dispatcher reactivates the suspended thread when it is notified that it should reactivate the thread that was suspended prior to its being called.

The present invention provides an application programming interface for creating multithreaded application programs. Since the master dispatcher allocates time among the application program's agents, the agency application programming interface provides non-preemptive multithreading. Furthermore, the agency application programming interface provides a means for splitting the currently activated thread and suspending it until it is reactivated. A multithreaded application program that uses the agency programming interface's multithreading capability does not have to be written to conform to the multitasking provided by the platform's operating system. Therefore, an agency application program can be ported to a new platform without having to rewrite code so that the application program conforms to the new platform's multitasking capabilities.

Because the agency interface mediates between the platform's shared system resources and an application program's agents, programs created using the agency application programming interface can be ported to a platform with a different programming interface without the need to replace system dependent code. This saves the programmer the time necessary to rewrite code. For example, an agency application program written to run on a platform with Windows TM could be recompiled to run a platform with OS/2 TM without the need to rewrite portions of the code. In addition, the look and feel of the agency application program's user interface can be ported to the new platform. The user interface of the ported version of the agency application program does not have to be modified to comport with the user interface on the new platform. For example, the version of an agency application program that runs on Windows TM could have the same user interface look and feel and the version of the same agency application program that runs on OS/2 TM.

Furthermore, since each agent has its own message dispatcher, an application programmer may alter the message passing framework provided by the agency programming interface. This allows an agency application program running on one platform to communicate with an agency application program running on a different platform with a different application programming interface. For example, an agency application program running on a platform with Windows TM could communicate with an agency application program running on a platform with OS/2 TM without a conversion of the messages that are passed.

The present invention also provides classes and class hierarchies in an application programming interface written in a non-object-oriented language. Because a subclass agent class can be derived from a base agent class, the agency interface provides a method for creating independent classes of agents which may be hierarchically related to each other. By using the agency application programming interface, application programmers have the benefits of these features without having to learn an object-oriented programming language and without being familiar with object-oriented programming. In addition, a compiler for the object-oriented language is not required and smaller programs which require less memory to run are generated. Therefore, this programming interface is ideal for application programmers who want to write application programs with class hierarchies in a non-object-oriented programming language, to run on a system with less memory than is necessary to run object-oriented programs.

DESCRIPTION OF THE PREFERRED EMBODIMENT

Figure 1:
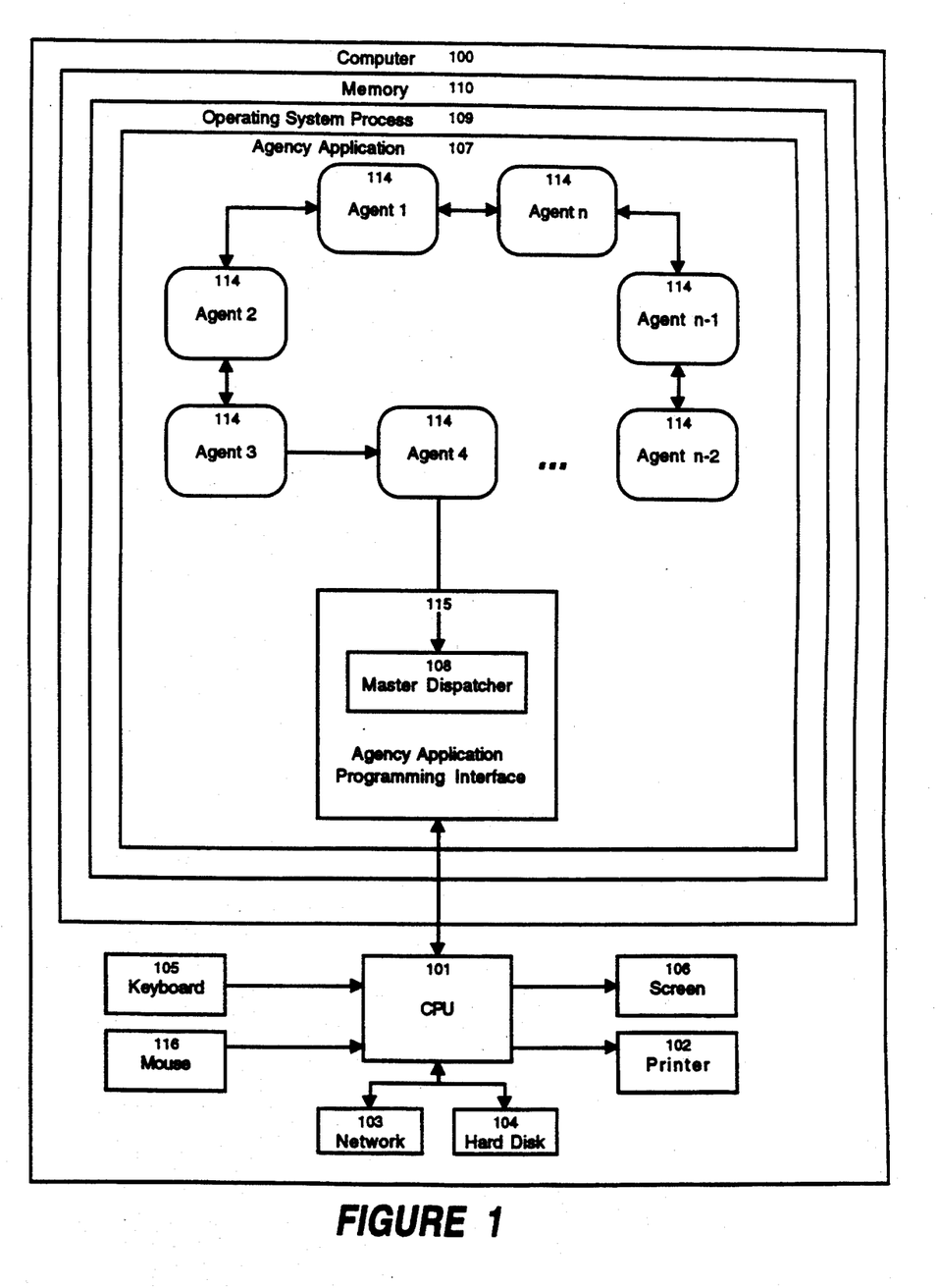
FIG. 1 is a block diagram of apparatus for practicing the present invention.

Referring now to FIG. 1, there is shown a functional block diagram of apparatus 100 for practicing the current invention. In the preferred embodiment, the central processing unit (CPU) 101 performs the steps of the method, although any type of processor or multiple processors may be used. The agency application 107 resides in memory 110 while the agency application 107 is running. The agency application 107 may reside on hard disk 104 or any other storage device when the agency application 107 is not running. In the preferred embodiment, an agency application 107 runs as an operating system process 109.

Referring now to FIG. 1, the agency application 107 is linked with the agency application programming interface (API) 115 and therefore, the agency API 115 is part of the agency application 107. The master dispatcher 108 is part of the agency API 115.

Figure 2:
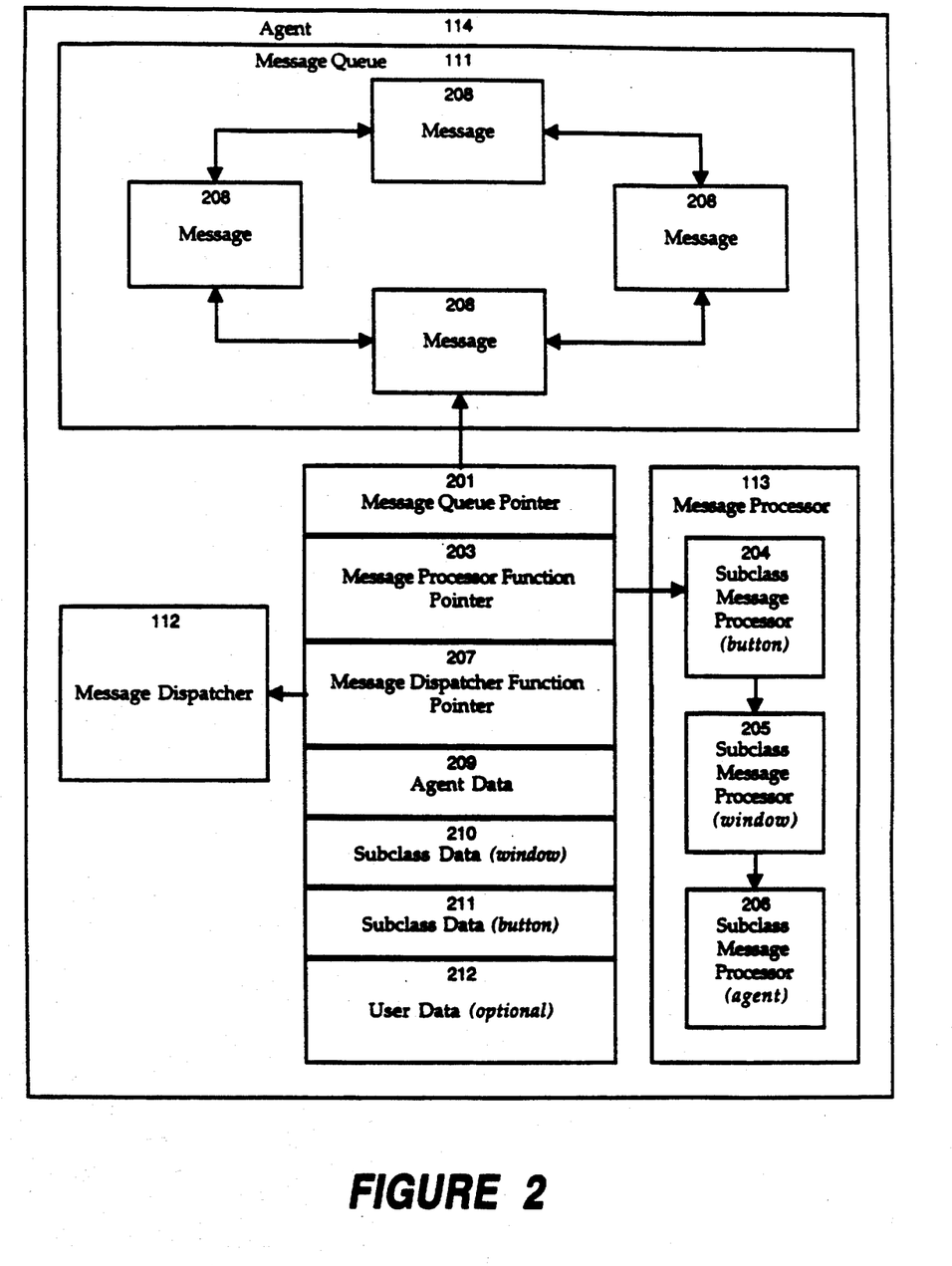
FIG. 2 is a block diagram of the preferred method of defining an agent according to the present invention.

An agency application 107 consists of one or more agents 114 Referring now to FIG. 2, each agent 114 in the agency application 107 contains three main parts: a message queue 111, a message dispatcher 112, and a message processor 113. In addition, the agent 114 contains various pointers and data structures. The master dispatcher 108 is part of the agency API 115, and maintains a list of the agents in the agency application 107.

The message processor 113 is used by the agent 114 to communicate with the agency API 115 and to communicate with other agents 114. An agent communicates by making calls to the agency API 115.

The agency API 115 supports multithreading because the master dispatcher 108 allocates time among the agents 114 within the agency application 107. Each agent 114 is a sub-process within the agency application process. The master dispatcher 108 activates an agent 114 by calling the agent's message dispatcher 112. The message processor 113 is the means by which the agent 114 performs its application function. When the activated agent 114 has completed performing its agency application function, it designates itself as inactive. When an agent 114 designates itself inactive, the master dispatcher 108 resumes and selects another agent 114 to activate. The agency API 115 provides non-preemptive multithreading by allocating its time slice among the agents 114 in the agency application 107. This is how the agency API 115 provides multithreading that is independent of the hardware platform's multithreading capabilities.

An agent 114 also contains a message queue pointer 201 that points to its message queue 111. The message queue 111 consists of a list of messages 208. An agent 114 also contains a message processor function pointer 203 that points to its message processor 113 and a message dispatcher function pointer 207 that points to its message dispatcher 112. The agent 114 contains agent data 209. If the agent class is derived from another agent base class then the agent 114 may contain additional subclass data 210. For example, if a button agent class is derived from a window class agent, the button agent contains window data and button subclass data.

By defining new agent classes, an application programmer may create a custom user interface for the agency application 107. Because the agency application user interface is created from agents 114, the user interface can be ported to a platform with a different type of user interface. Consequently, an agency application 107 running on Windows TM can have the same user interface look as the version of that agency application 107 running on XWindows. The agency application's user interface does not have to be modified to comport with the platform's user interface. So, the versions of the same agency application 107 for different platforms can have the same user interface.

Figure 3:
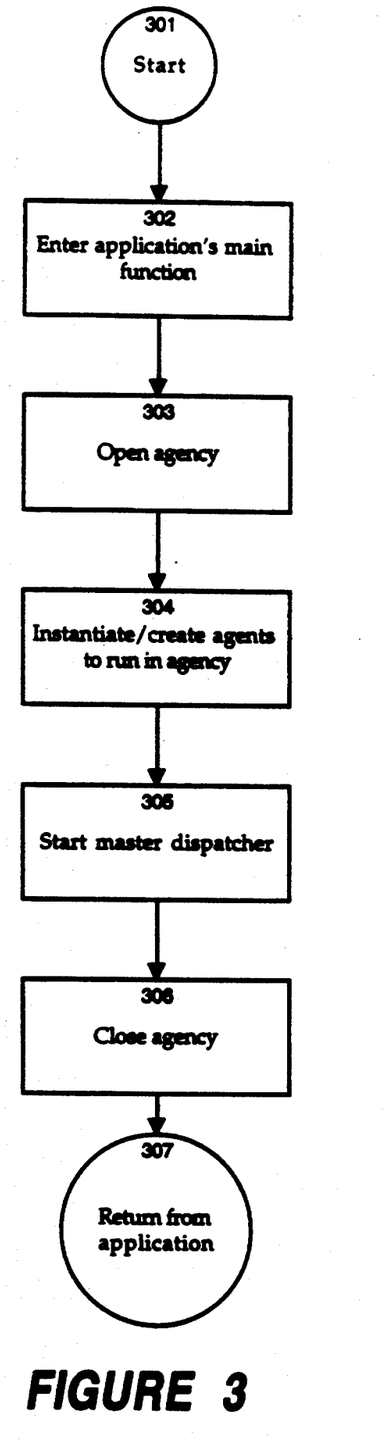
FIG. 3 is a flow chart showing operation of an agency application program according to the present invention.

Referring now to the flow chart of FIG. 3, there is shown a preferred method of running an agency application 107. In the preferred embodiment, the steps shown in FIG. 3 are performed by the CPU 101. First, the CPU 101 enters the agency application's 107 main function 302. The CPU 101 then opens the agency 303. In this step 303, any platform specific operations that must be completed so that the agency application 107 can run are performed. For example, system resources are allocated and structures necessary for the agency API 115 to manage agents 114 are initialized. The CPU 101 then creates agents 114 that are part of the agency application 304; starts the master dispatcher 305; and then closes the agency 306. In this step 306, system resources are deallocated and any platform specific operations that were performed in order for the agency application 107 to run are reversed. Finally the CPU 101 returns from the application 307.

Figure 4:
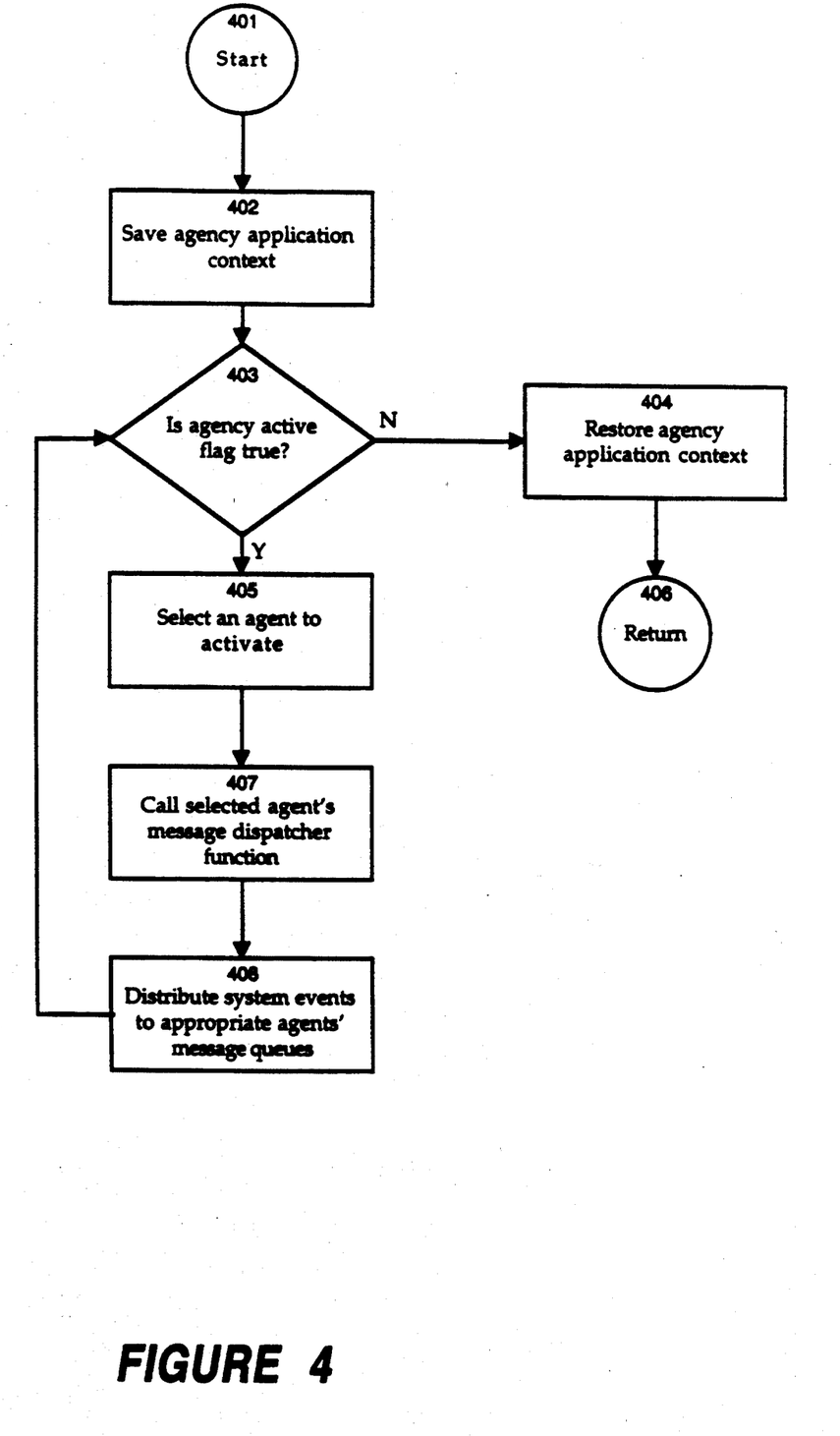
FIG. 4 is a flow chart showing operation of the master dispatcher according to the present invention.

Referring now to the flow chart of FIG. 4, there is shown a preferred method of API multithreading. In the preferred embodiment, the steps shown in FIG. 4 are performed by the CPU 101. First the CPU 101 saves the agency application context 402. The agency application context includes which agent 114 is currently activated, which agent 114 currently receives keyboard 105 input and which agent 114 currently receives mouse input. The CPU 101 then checks if the agency active flag is true 403. If the agency active flag is not true, the CPU 101 restores the agency application context 404 and returns 406.

If the agency active flag is true, the master dispatcher 108 selects an agent 114 to activate 405 and then calls the selected agent's message dispatcher 407. The selected agent 114 is activated and runs until it has completed its agency application function. When the selected agent designates itself as inactive, the master dispatcher 108 resumes and distributes system events to the appropriate agents' message queues 408. This is how the agency API 115 mediates between the agency application 107 and system resources. The agency application 107 is portable because it does not make direct system calls. However, an agent's 114 message dispatcher 112 may directly access system resources. This makes the agency API 115 flexible.

A thread of execution can be split when the currently activated agent 114 activates the master dispatcher 108 by calling the master dispatcher 108. The current agent's thread is then suspended until the master dispatcher 108 reactivates the thread. The master dispatcher 108 resumes running and selects an agent to activate. The master dispatcher 108 may select the agent 114 whose thread was previously suspended. The master dispatcher 108 is notified, by a call to the agency API 115 that sets the agency active flag to false, that it should stop the selection and activation of agents, and reactivate the thread that was suspended prior to the call to the master dispatcher 108. When the master dispatcher 108 determines that the agency active flag is false 403, it restores the agency application context 404 and returns 406. The suspended agent thread is thereby reactivated.

Figure 5:
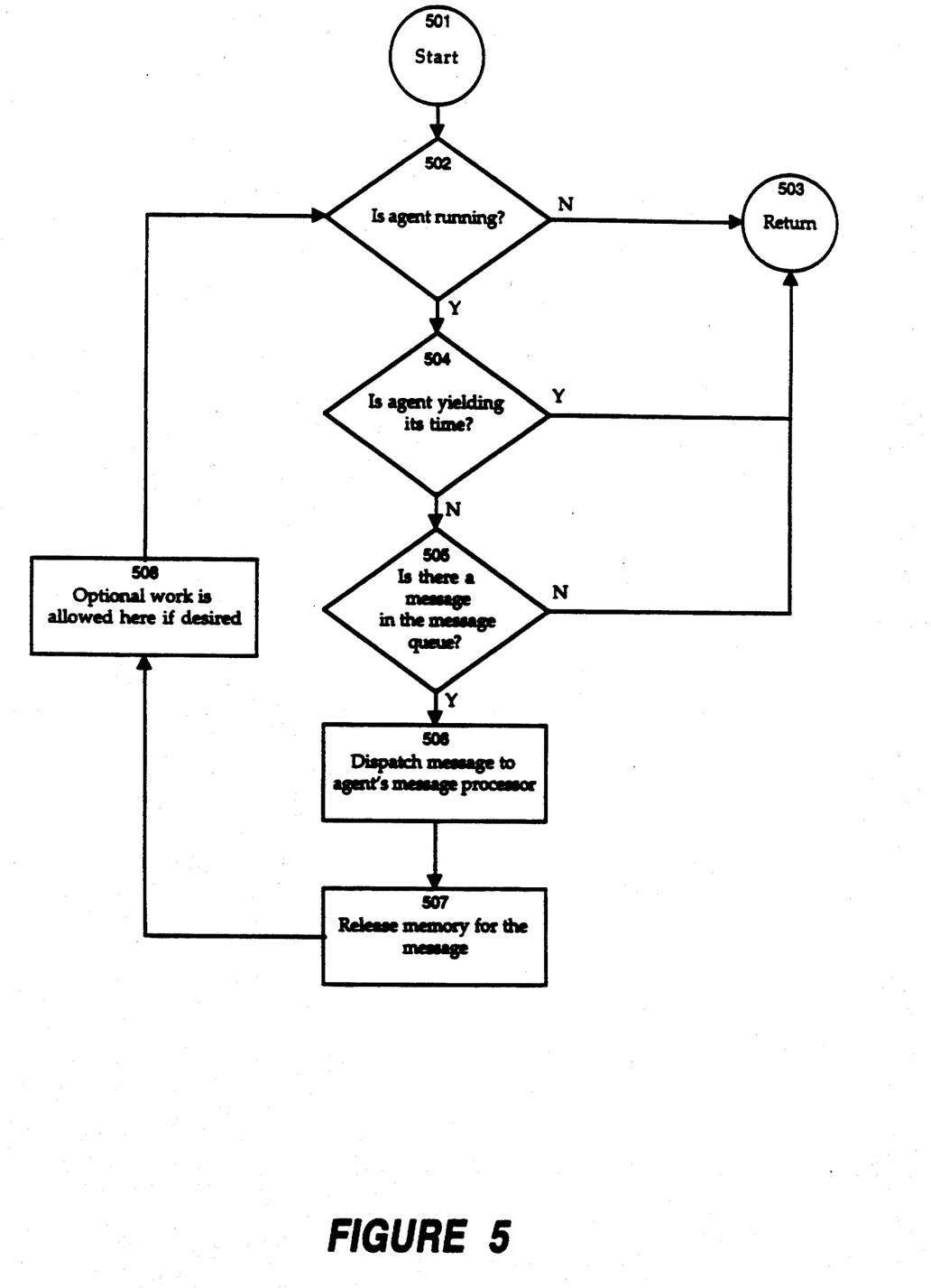
FIG. 5 is a flow chart showing sample operation of an agent's message dispatcher according to the present invention.

Referring now to FIG. 5, there is shown a flow chart of an example of the operation of an agent's message dispatcher 112. In the preferred embodiment, the steps shown in FIG. 2 are performed by the CPU 101. The CPU 101 checks if the agent 114 is running 502. If the agent 114 is not running it returns 503 and the agent 114 is designated as inactive. The CPU 101 then checks if the agent 114 is yielding its time 504; if the agent 114 is yielding its time, the CPU 101 returns 503. The CPU 101 then checks if a message exists in the message queue 505. If there are no messages 208 in the message queue 111, the CPU 101 returns 503.

If there is a message 208 in the message queue 111, the message 208 is dispatched 506 to the agent's message processor 113. The CPU 101 then releases the memory for the message 507 and may perform optional additional work 508 before checking if the agent 114 is running 502 again. An agent's message dispatcher 112 may do what an application programmer chooses for it to do. Therefore, the agency API 115 is flexible. The only requirement is that at some point the agent's 114 message dispatcher 112 designates itself inactive so that the master dispatcher 108 can resume.

The agent's message dispatcher may be written differently than the example message dispatcher 112. For example an agent's message dispatcher 112 could be written so that the agent 114 has three message queues or so that the agent 114 takes messages 208 from another agent's message queue 113. An agent may collect information from other sources besides its own message queue 113. This allows the application programmer to alter the message passing framework provided by the agency API 115. Therefore, an agency application 115 running on one platform can communicate with an agency application 115 running on a different platform with a different operating system without converting the message passing code.

Figure 6:
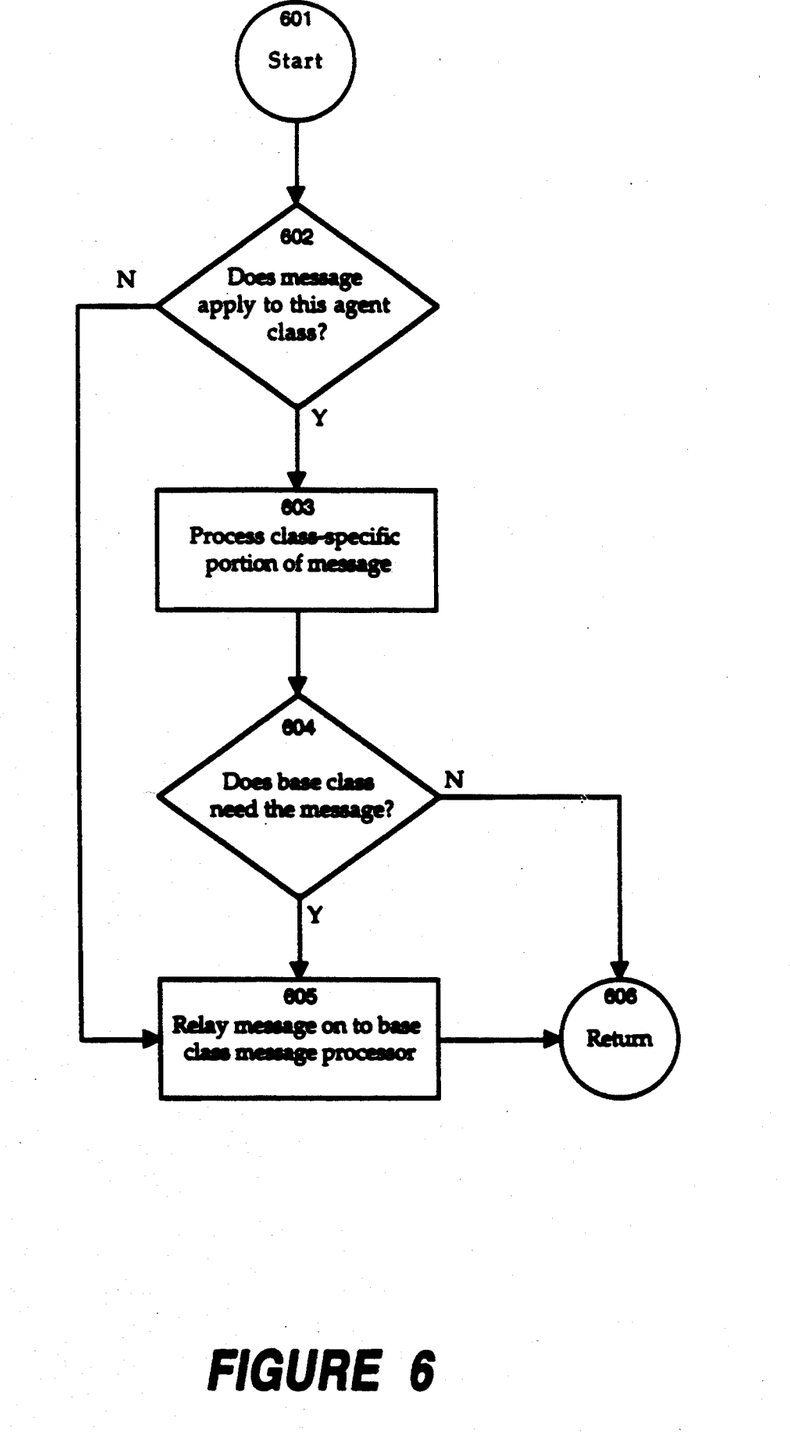
FIG. 6 is a flow chart showing sample operation of an agent's message processor according to the present invention.

Referring now to FIG. 6, there is shown a flow chart of an example of the operation of an agent's message processor 113. In the preferred embodiment, the steps shown in FIG. 6 are performed by the CPU 101. First the CPU 101 checks if the message 208 applies to the agent class 602. If the message 208 does not apply to the agent class, the CPU 101 relays the message to the base class 605 by calling the base class message processor 113 and then returns 606.

If the message 208 applies, the message processor 113 processes the portion of the message 208 that applies to the agent's specific class data 603. The CPU 101 then checks if the agent's base class needs the message 604. If not, the message processor 113 returns 606. If the base class needs the message 208, the message 208 is relayed to the base class 605 by calling the base class message processor 113. This is how each agent 114 subclass remains independent of its base class(es). The agent's 114 message processor only has to update its specific subclass data 210; it then calls the base class message processor 113 to update the general base class data. The CPU 101 then returns 606.

Figure 7A:
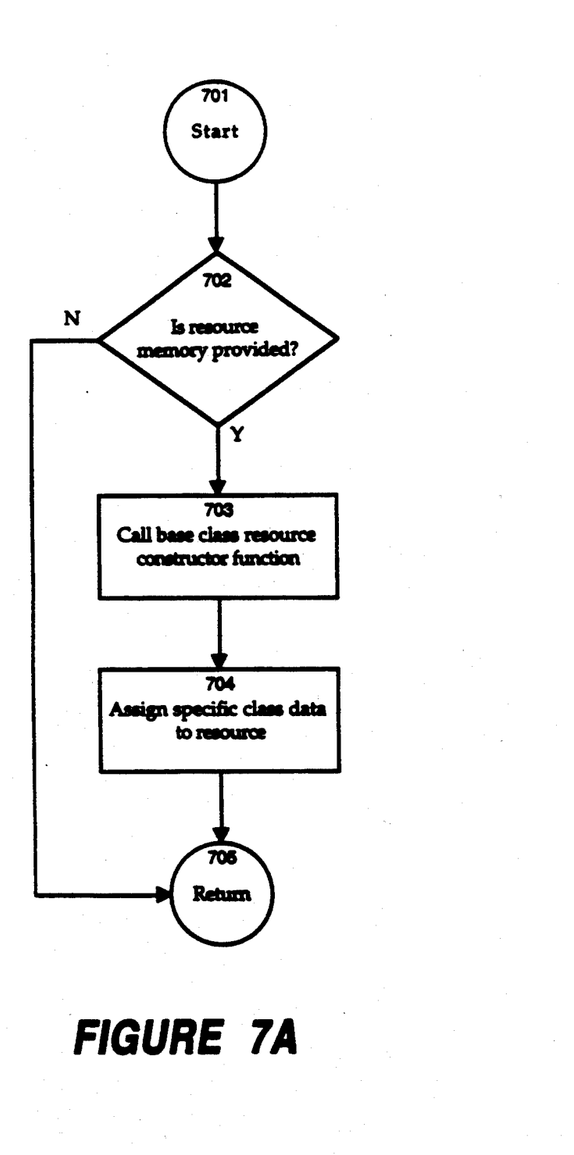
FIG. 7A is a flow chart showing the creation of an agent class resource according to the present invention.
Figure 7B:
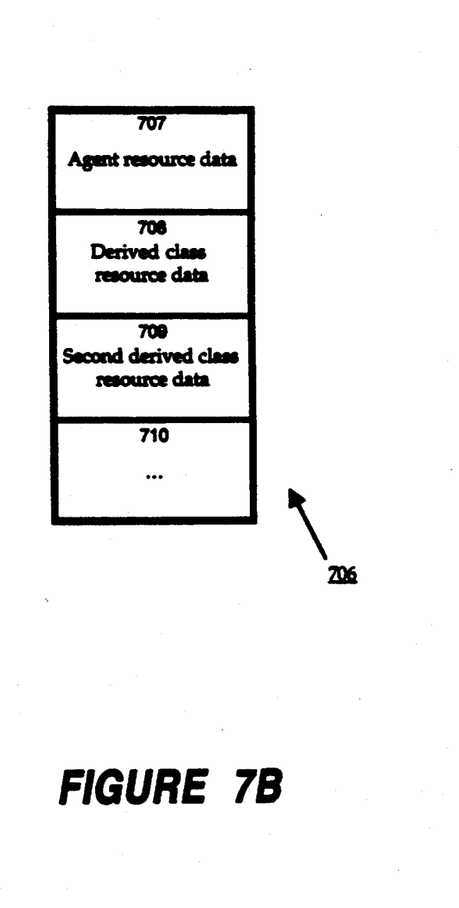
FIG. 7B shows agent class resource structure.

Referring now to FIG. 7A, there is shown a flow chart for an agent's resource constructor function. FIG. 7B shows the agent class resource 706, which provides the programmer with the ability to modify the definition of an agent 114 without changing the agency application code. The agency class resource 706 contains information 707, 708, 709, 710 necessary to create an agent instance. In the preferred embodiment, the steps shown in FIG. 7 are performed by the CPU 101. Agents 114 are created 304 after the agency is opened 303. Agents also can be created before the master dispatcher is started 305 and can be created by an agent's message processor 113.

Creating or loading an agent class resource 706 is part of the process of creating an agent instance. First the agent's structure and data are defined through the creation or definition of an agent class resource 706. If an agent class resource 706 exists, it is loaded into memory 110. To create an agent class resource 706, the CPU 101 calls the class resource constructor function. Each class resource constructor function follows these basic steps. First, the CPU 101 checks 702 if resource memory 110 is provided. If memory 110 is not provided, the CPU 101 returns 705. If memory 110 is provided, the CPU 101 calls the agent's base class resource constructor function 703 and then assigns the agent's specific class data to the resource 704. The CPU 101 then returns 705. Once the agent class resource 706 has been created or loaded, it is used to create one or more agent instances.

Figure 8:
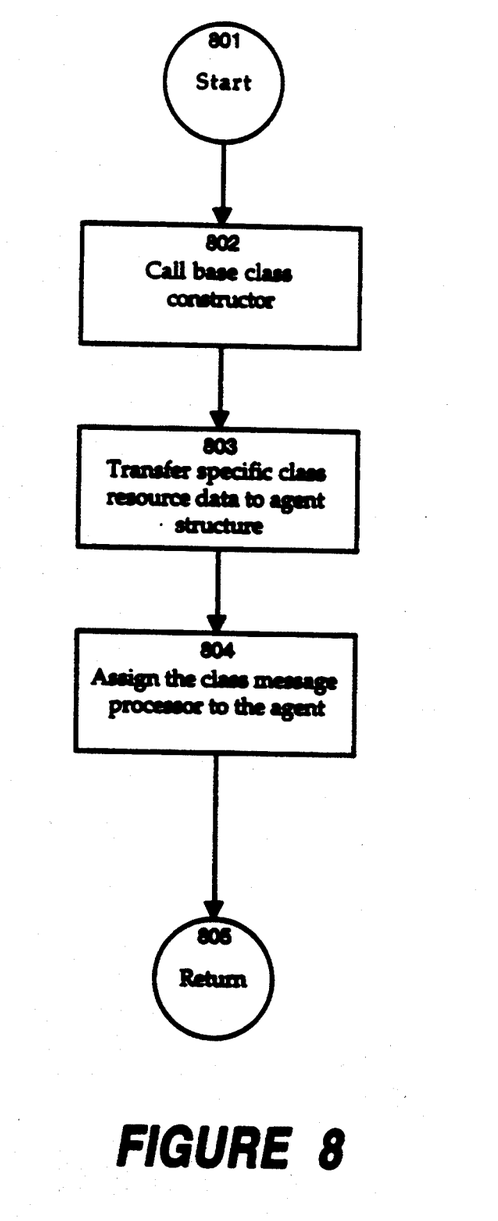
FIG. 8 is a flow chart showing sample operation of an agent's constructor function according to the present invention.

Referring now to FIG. 8, there is shown a flow chart for an agent's constructor function. In the preferred embodiment, the steps shown in FIG. 8 are performed by the CPU 101. First the CPU 101 calls the agent's base class constructor 802. Every agent has at least one base class because the agent class is a base class of all agents. The CPU 101 then transfers specific class resource data to the agent structure 803. For example, if a button agent class is a subclass of a window agent class, the window agent's constructor is called and then the button agent's resource data is transferred into the button agent's subclass data 211.

Next, the CPU 101 assigns the agent its class' message processor 804 and returns 805. Every agent class has a constructor function of this form. Each agent class remains independent because each agent 114 only transfers specific class data and relies on the base class constructor function to transfer the general class data.

Figure 9:
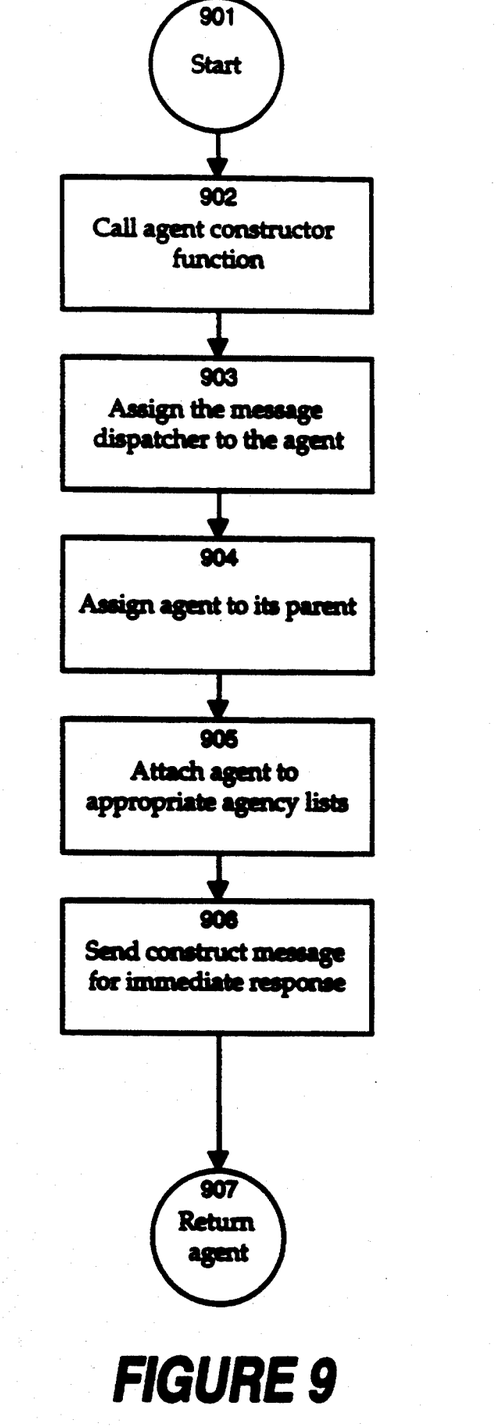
FIG. 9 is a flow chart showing agent creation in an agency application program according to the present invention.

Referring now to FIG. 9, there is shown a flow chart for the placement of an agent 114 in its context. This is the next step in the creation of an agent instance. The agent's context is its position relative to other agents 114 in the agency application 107. An agent has parents, siblings, and children, which are set to define its position within the agency application 107. For example, if there are currently four window agents 114 open and displayed in the agency application 107, then the windows may overlap each other on the screen 106. Each level of overlap is a layer on the screen 106. The parent, children, and sibling pointers indicate which agents are in the layer behind, in the layer in front of, and in the same layer as the window agent 114.

In the preferred embodiment, the steps shown in FIG. 9 are performed by the CPU 101. First the CPU 101 calls the agent constructor function 902. The CPU 101 then assigns a message dispatcher 112 to the agent 903. Next the CPU 101 assigns the agent to its parent 904, attaches the agent to its appropriate agency lists 905, and sends a construct message for immediate response 905 to the agent 114 In response to a construct message, an agent 114, if necessary, allocates and initializes any class specific instance data or storage space. The CPU 101 then returns the agent 907. After each agent 114 is created and initialized 304 the agency master dispatcher is started 305 and the agency application 107 runs until the master dispatcher 108 returns.

Figure 10:
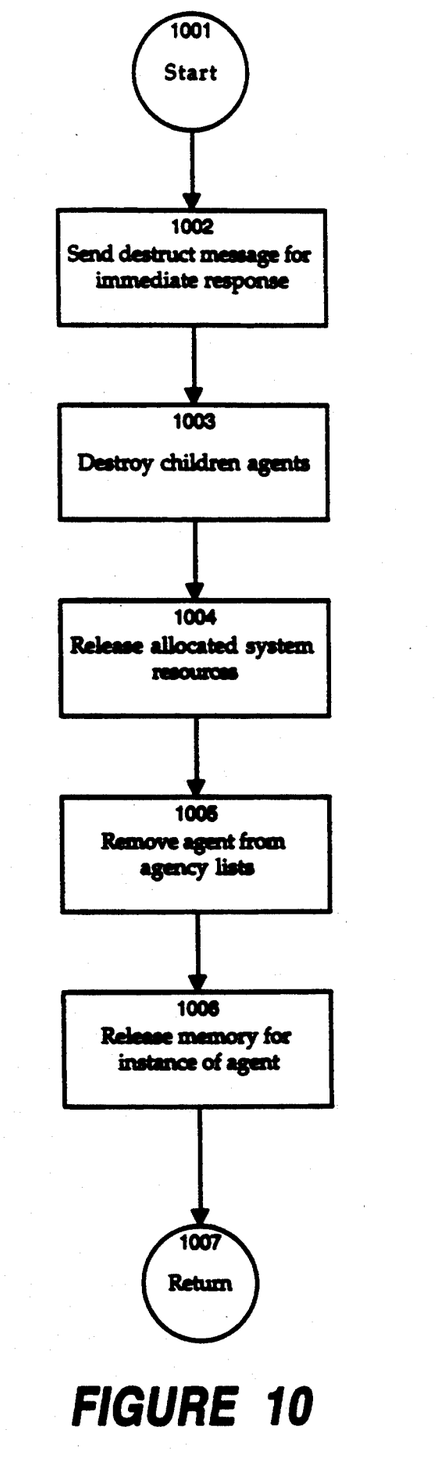
FIG. 10 is a flow chart showing agent destruction in an agency application program according to the present invention.

Referring now to FIG. 10, there is shown a flow chaff for the destruction of an agent instance. All agents 114 are destroyed before the agency application 107 has completed execution; however agents 114 can be destroyed at any time during the execution of the agency application 107. In the preferred embodiment, the steps shown in FIG. 10 are performed by the CPU 101.

The CPU 101 first sends a destruct message for immediate response 1002 to the agent 114. The CPU 101 then destroys children agents 1003; releases allocated system resources 1004 including pending messages 208; removes the agent from the agency lists 1005 including the multithreading list maintained by the master dispatcher 108; and finally releases memory 110 for the agent instance 1006 before returning 1007.

What is claimed is:

1. A system for implementing an agent-based application program on a computer, comprising:
a processor;

an input device coupled to the processor, for accepting input;

an output device coupled to the processor, for providing output;

memory unit coupled to the processor, for storing data and program instructions;

an operating system, stored in the memory and managing a plurality of processes created by execution of program instructions in the memory unit by the processor;

and at least one agency application unit coupled to the processor and managing a plurality of agents stored in the memory unit, and including:

a master dispatcher coupled to the plurality of agents, for receiving from, and sending messages to the agents, and responsive to all agents being inactive, selecting an agent and activating the selected agent;

the plurality of agents, each agent responsive to being activated by the master dispatcher, for executing an application function, each agent comprising:

a message dispatcher for receiving a signal from the master dispatcher activating the agent, and for dispatching at least one message providing for execution of the application function;

at least one message queue, for receiving and storing at least one message from the master dispatcher and from other sources, and operatively coupled to the message dispatcher and responsive to the agent being active, for passing at least one stored message to the message dispatcher for dispatching; and a message processor operatively coupled to the message dispatcher and receiving a dispatched message, for executing the application function of the received message.

2. The system of claim 1, wherein each agent, responsive to completing at least one application function, designates itself as inactive.

3. The system of claim 1, wherein:

the agency application unit further includes an agent list coupled to the master dispatcher; and the master dispatcher selects a first agent from the agent list, and activates the first agent by invoking the first agent's message dispatcher, the first agent executing selected processes with the processor, such that the master dispatcher waits to select or activate a second agent until the first agent has designated itself inactive.

4. The system of claim 1, wherein the message processor of a first agents calls the master dispatcher of the agency application unit, the master dispatcher suspending the first agent, selecting at least one second agent, and activating the second agent, and unsuspending the first agent when the second agent designates itself inactive.

5. The system of claim 1, wherein the message dispatcher of an activated agent retrieves a message stored in a message queue of a deactivated agent, and passes the retrieved message to the message processor of the activated agent for executing the application function of the retrieved message.

6. The system of claim 1, wherein the message dispatcher of an activated agent stores a message in a message queue of a deactivated agent.

7. The system of claim 1, wherein there is a base agent class, and a plurality of agent subclasses derived from the base agent class, and wherein there is an agent list, each agent in the agent list being an instance of one agent subclass, wherein:

the message processor of an activated agent determines whether a received message applies to the agent subclass of which the activated agent is an instance;

responsive to the received message applying to the agent subclass, executing the application function of the received message; and responsive to the received message not applying to the agent subclass, calling a base class message processor, the base class message processor executing the application function of the received message.

8. The system of claim 1, wherein the message dispatcher dispatches messages from the message queue to the message processor until the message queue is empty.

9. The system of claim 1, wherein the message dispatcher dispatches messages from the message queue to the message processor until the agent signals that it is yielding its time, the message dispatcher deactivating the agent.

10. The system of claim 1, wherein the message dispatcher creates a process for execution by the processor in addition to any application functions executed by the message processor.

11. The system of claim 1, wherein the master dispatcher preemptively activates a selected agent.

12. A computer-implemented process for controlling agent operation in an agent-based application program having a plurality of agents, comprising the steps of:

responsive to all agents being inactive, performing the substeps of:
  selecting an agent; and
  activating the selected agent;

responsive to at least one agent being active, the agent performing the operations of:

receiving at least one message from a source external to the agent, or from the agent itself, the message providing for the execution of an application function;

storing received messages in a message queue coupled to the agent;

determining if the message queue contains at least one message;

responsive to the message queue containing at least one message,
  removing a message from the message queue and performing an application function according to the message; and responsive to the message queue being empty, designating the agent as inactive.

13. The method of claim 12, wherein an agent further performs the operations of:

selecting one of a plurality of messages queues, each message queue for storing a plurality of messages; and storing a received message in the selected message queue.

14. The method of claim 12, wherein the step of receiving at least one message further comprises the substeps of:

retrieving a message stored in a message queue of a deactivated agent.

15. The method of claim 12, further comprising the operation of:

storing a message in a message queue of a deactivated agent.

16. The method of claim 12, wherein the steps of removing the message from the message queue and performing the application function according to the message are performed until the message queue is empty.

17. The method of claim 12, wherein the steps of removing the message from the message queue and performing the application function according to the message are performed until the agent yields its time.

18. The method of claim 12, wherein the step of activating the selected agent is performed preemptively.

19. The method of claim 12, further comprising the step of the message dispatcher of an activated agent creating a process for execution by a processor in addition to any application function executed by the message processor.

* * * * *